April 4, 1950     E. B. WAGNER     2,503,181
TRUSSED TRACK TOWER VEHICLE
Filed July 14, 1948     3 Sheets—Sheet 1

INVENTOR.
Eddie B. Wagner
BY Buckhorn and Cheatham
ATTORNEYS

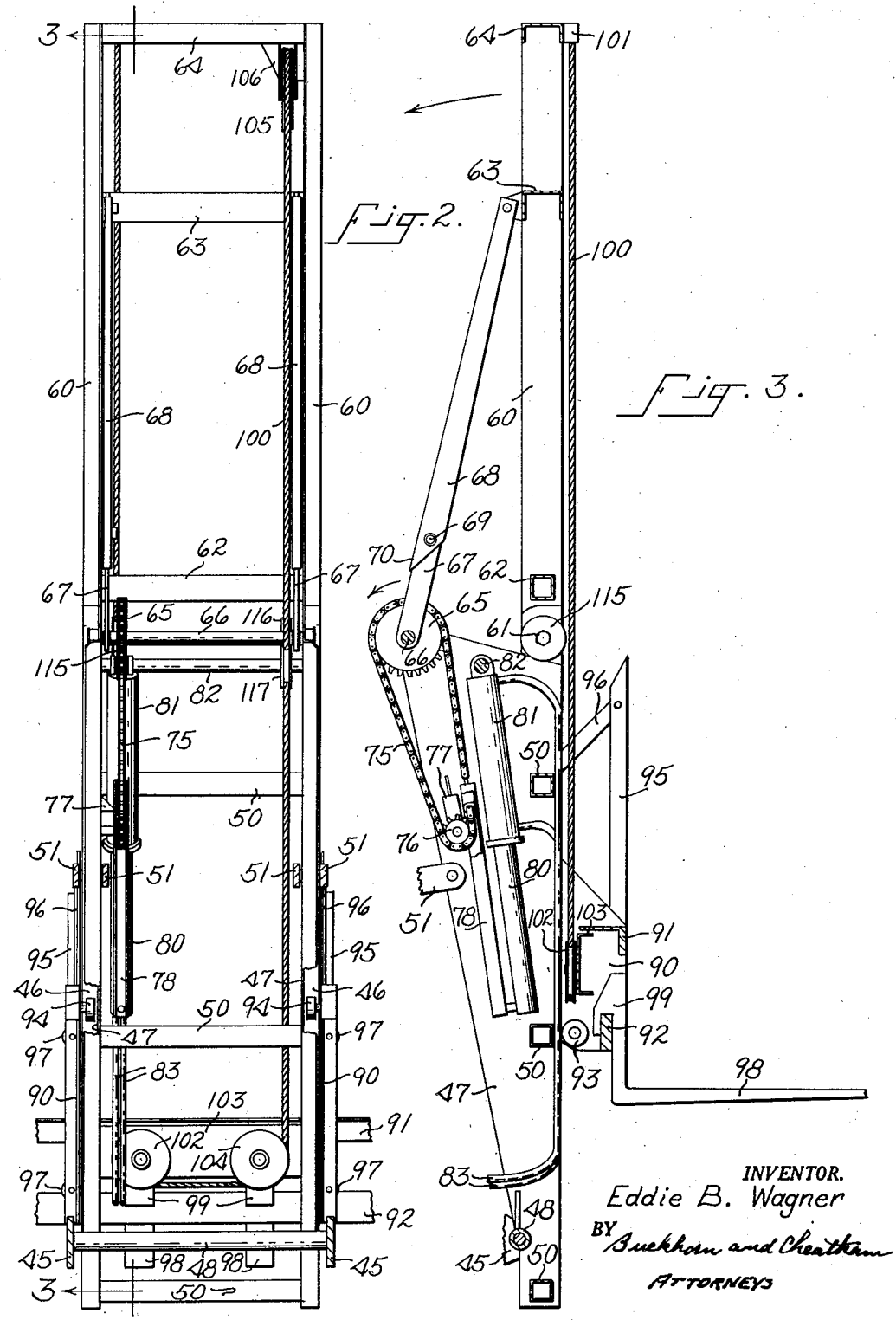

April 4, 1950 E. B. WAGNER 2,503,181
TRUSSED TRACK TOWER VEHICLE

Filed July 14, 1948 3 Sheets-Sheet 3

INVENTOR.
Eddie B. Wagner
BY Buckhorn and Cheatham
ATTORNEYS

Patented Apr. 4, 1950

2,503,181

UNITED STATES PATENT OFFICE 2,503,181

TRUSSED TRACK TOWER VEHICLE

Eddie B. Wagner, Portland, Oreg.

Application July 14, 1948, Serial No. 38,579

4 Claims. (Cl. 214—113)

1

The present invention relates to an automotive material handling vehicle. The principal object of the present invention is to provide an improved, sturdy form of collapsible tower upon which a material handling device is guided for vertical movement. The present invention is in many respects an improvement upon the invention described and claimed in my copending application, Serial No. 18,943, filed April 5, 1948.

A further object of the present invention is to provide improved means for supporting a collapsible elevating tower mounted upon a vehicle, and improved means for moving a material handling device along the tower. An advantage of the present invention is that the tower may be moved in either direction from the vertical so that objects held on a material handling device will either be forced against the back of the device for greater security and swung over the chassis for greater stability of the vehicle, or the tower may be canted in the opposite direction to facilitate dumping the load from the material handling device.

A further object of the present invention is to provide an improved automotive vehicle of the character described wherein greater safety and ease of operation are provided by reason of the construction of the tower and of the material handling device thereon.

A further object of the present invention is to provide a collapsible tower which may be collapsed to a considerable extent by one simple, quick operation whereby the vehicle may pass through doorways and under low obstructions, or may be elevated by one simple reverse operation, the tower in elevated condition being locked against accidental collapsing movement.

A further object of the present invention is to provide a new and improved form of counterbalancing means for a vehicle of the character described.

The objects and advantages of the present invention will be more apparent from inspection of the following specification taken in connection with the accompanying drawings wherein like numerals refer to like parts throughout, while the features of novelty will be more distinctly pointed out in the appended claims.

In the drawings Fig. 1 is a side elevation of a vehicle having the present invention thereon, with certain portions of the vehicle broken away to illustrate details thereof;

Fig. 2 is a vertical section showing the tower and operating mechanism therefor on an enlarged scale taken substantially along line 2—2 of Fig. 1;

Fig. 3 is a vertical section taken substantially along line 3—3 of Fig. 2;

Fig. 4 is a view similar to Fig. 1 with parts broken away at a different plane to illustrate a

Figures 1, 6:
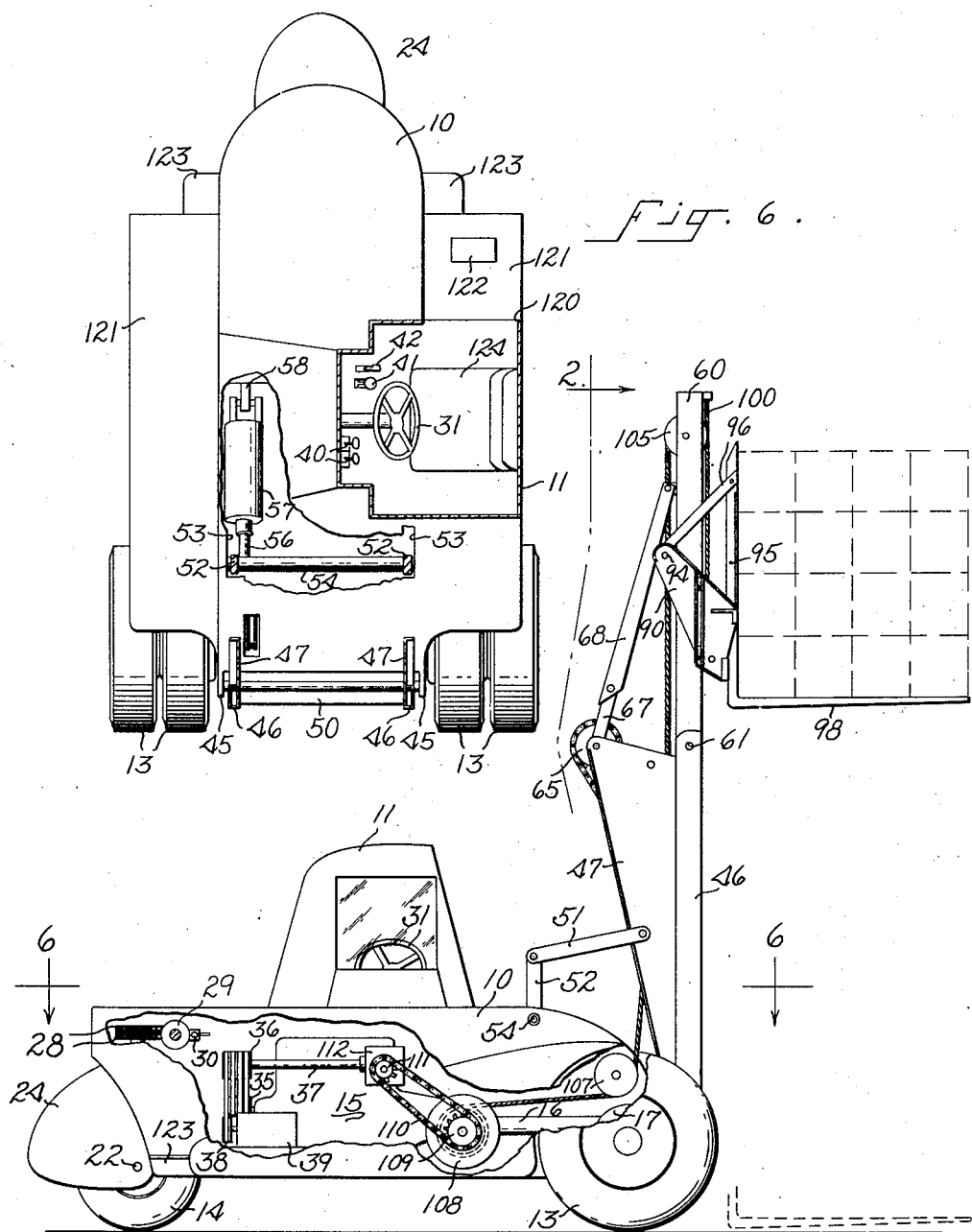
Figure 5:
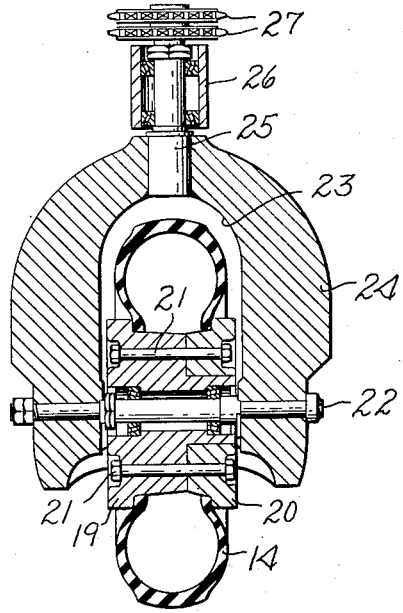
Figure 4:
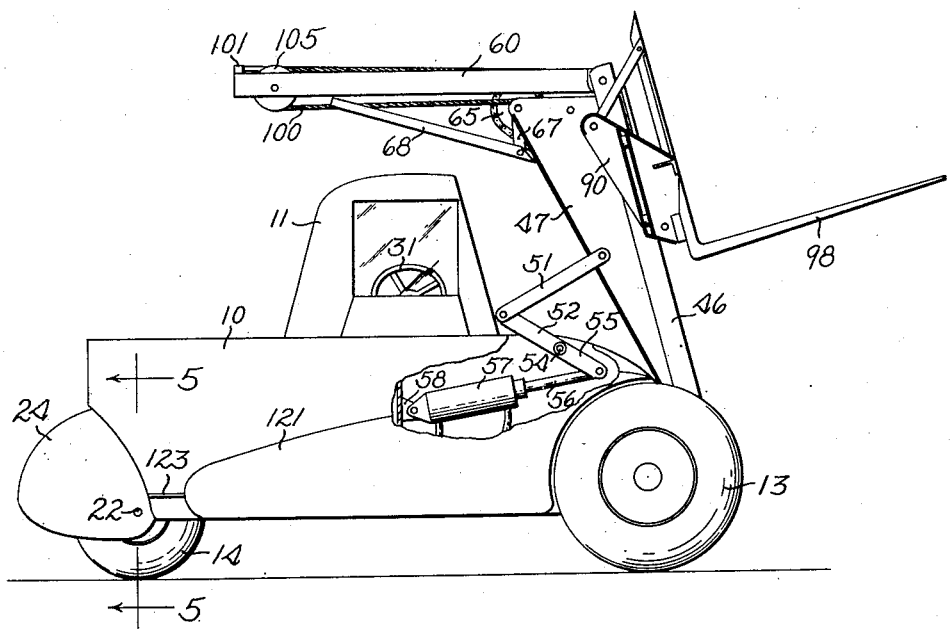

2 further portion of the tower operating mechanism and showing the tower in collapsed condition;

Fig. 5 is a vertical section on an enlarged scale taken substantially along line 5—5 of Fig. 4; and Fig. 6 is a horizontal section on an enlarged scale taken substantially along line 6—6 of Fig. 1.

The vehicle of the present invention comprises a chassis 10 having an operator's cab 11 thereon, the chassis being supported upon spaced pairs 13 of forward driving wheels and a single centrally located tiller wheel 14. The vehicle could be a four-wheel or multiple axle vehicle and have the present invention incorporated therein, however it is preferred that the close-coupled, short turning radius type of vehicle illustrated be employed.

The vehicle is driven from place to place by an automotive engine 15 mounted centrally of the vehicle and as close to the rear thereof as possible. The engine is coupled to the driving wheels through a propeller shaft 16 and differential contained in a housing 17. The tire of the rear wheel 14 is mounted on a massive hub including two separable, oppositely flanged parts 19 and 20 retained in assembled position by bolts 21. The hub is mounted upon a shaft 22 extending across a wheel retaining cavity 23 in a massive fender 24 which is preferably a solid casting weighing several hundred pounds. A tiller post 25 is fixed to the upper central portion of the fender 24 and is supported in bearings mounted in a bearing box 26 positioned in the rear end of the chassis. The upper end of the tiller post has a pair of sprocket gears 27 fixed thereto about which pass oppositely directed sprocket chains 28 connected to a hydraulic steering cylinder 29 as set forth in the aforementioned application, Serial No. 18,943. The steering cylinder is moved transversely of the vehicle to rotate the tiller post by means of a control valve 30 connected to a steering wheel 31 situated in the driver's cab. The position of the valve 30 determines the direction of movement of the tiller wheel 14 by admitting fluid under pressure to the cylinder in one direction or the other. Means for creating fluid pressure may comprise a multiple sheave pulley 35 fixed to the engine shaft and driving a multiple sheave pulley 36 on an auxiliary shaft 37. One of the sheaves on pulley 36 is connected to a pulley 38 which drives a hydraulic pump 39. The pump is connected through suitable tubes and control valves 40 in the driver's cab to various material handling mechanisms as will be described later and, in addition, connected to the steering control valve 30. Rotation of the steering wheel 31 causes pivoting of the tiller wheel 14 and the fender 24 about the post 25. The vehicle is controlled by the operator through the medium of the normal control devices such as gear shift lever 41 and hand brake 42. Various other of the usually encountered vehicle controls such as throttle, foot brake and clutch pedal are not herein illustrated, as they are so well known in the art.

At the front of the vehicle a pair of ears 45 project forwardly from the chassis just inside of the front wheels 13. A pair of lower track sections including rectangular tracks 46 and elongated triangular truss plates 47, providing a bracing structure, extending rearwardly from the upper ends of the tracks, are pivotally mounted on a pivot 48 supported by the ears 45. The tracks 46 are connected together by a plurality of cross braces 50. The rear edges of the plates 47, at a point practically midway thereof, are pivotally connected to rearwardly directed links 51 which are pivotally connected to the upper ends of levers 52 extending through slots 53 in the top of the chassis. The levers 52 are connected to a transverse shaft 54 mounted in the chassis. One of the levers 52 has a lower extension 55 which is pivotally connected to the end of a piston rod 56 retained in a cylinder 57 pivotally mounted on a bracket 58 within the chassis. Fluid is admitted to either end of cylinder 57 under control of one of the valves 40 so as to extend or retract piston 56 and thus rock the tracks 46 about the pivot 48. The extent of movement is preferably such that the tracks may be inclined rearwardly as seen in Fig. 4, thus to cause a heavy load to be better balanced on the vehicle and prevent forward tipping of the vehicle, and also to prevent the load from slipping from its support; and the tracks are preferably movable forwardly to a sufficient extent to permit a load to slide from its support.

The tower comprises an extension including a pair of tracks 60 pivotally connected by a pair of pivot bolts 61 to the upper ends of the lower tracks 46, the tracks being cross braced by braces 62, 63 and 64. A tower elevating mechanism including a pair of toggles is connected between brace 63 and the rear corners of the plates 47. The mechanism includes a partially rotatable sprocket gear 65 fixed to a cross shaft 66 to which is affixed a pair of toggle links 67. The free ends of links 67 are received in the lower ends of channel bars 68, forming the other toggle links, and pivotally fastened thereto by pins 69, the upper ends of the channel bars being connected to the cross brace 63. The channel bars 68 include overhanging portions 70 which bear against the links 67 when the tower is elevated as seen in Fig. 3 so as to prevent passage of the tower beyond a vertical position, as is well known in such devices. The pins 69 are preferably located so as to pass slightly inside of the line between the centerlines of shaft 66 and the pivots connecting links 68 to brace 63 so as to lock the section in elevated position.

The gear 65 is partially rotated by a sprocket chain 75 passing thereabout and about a sprocket gear 76 mounted on a bracket 77 fixed to one of the plates 47. Both ends of the chain 75 are fastened to a movable shifting member 78 in the form of a channel bar which may receive a portion of the gear 76 therein and be guided thereby. The channel bar 78 is fastened to the lower end of a piston rod 80 extending downward from a cylinder 81 pivotally mounted upon a cross shaft 82 connected to triangular plates 47. Fluid may be admitted to either end of the cylinder 81 through tubes 83 leading to the pump 39 and one of the control valves 40. When the piston rod 80 is extended as illustrated in Fig. 3 the extension of the tower is held in elevated position as therein shown. When the piston is retracted the toggles comprising the links 67 and 68 are broken and the upper section of the tower is lowered to a horizontal position above the cab as seen in Fig. 4.

A material elevating carriage is mounted upon the tower and guided by the track sections 46 and 60. The carriage comprises a pair of side plates 90 connected together by cross braces 91 and 92. Each plate 90 supports a lower front guide wheel 93 engaging the front surfaces of the tracks and an upper rear guide wheel 94 engaging the rear surfaces of the track sections 46 and 60. The upper portion of the carriage comprises a pair of vertical bars 95 braced by diagonal bars 96 extending to the upper rear portions of the carriage side plates. A pair of lateral guide wheels 97 are mounted on each plate 90 in position to engage the outer surfaces of the tracks. The lower cross brace 92 is preferably in the form of a strong bar having its narrow dimension horizontal so that material handling devices such as the tines 98 may be mounted thereon by providing the tines with vertical rear legs including a hook portion 99 adapted to hook over the bar 92. If it is desired to replace the tines by some other form of load handling device such as a hay fork, platform, bucket, scoop, or scraper blade, the tines may be unhooked from the bar 92 and the other type of device hung on the bar.

In order to move the carriage vertically of the track, carriage elevating means are provided as follows: A cable 100 is fixed to an anchor 101 mounted at one corner of the top cross brace 64. The cable extends downward and about a pulley 102 mounted at one end of a channel bar 103 connecting the carriage plates 90. The cable then passes horizontally about a second pulley 104 at the opposite end of the channel bar 103, then upward about a pulley 105 mounted in a support 106 at the end of the cross brace 64 opposite to the anchor 101. The cable then passes downward through an opening in the forward end of the chassis and about a pulley 107 mounted therein, then horizontally rearward and is wound upon a winch drum 108 mounted in the chassis. The drum is fixed to a sprocket gear 109 driven by a sprocket chain 110 and sprocket gear 111, the latter being driven by suitable gears in a gear box 112 into which the auxiliary shaft 37 extends. The gear 109 may be continuously driven and the winch intermittently connected thereto as by means of a control device such as disclosed in the patent to Wagner et al., No. 2,300,752, issued November 3, 1942, or equivalent. Details of such a control device are not herein illustrated, since many such devices may be utilized and are well known in the art. It is sufficient that a winch is illustrated by means of which the carriage may be elevated along the track sections under control of the vehicle driver.

In order that the carriage may be moved along the lower tower section when the upper section is collapsed as seen in Fig. 4, the various vertical flights of cable are guided as follows: The first flight between anchor 101 and pulley 102 is guided about a pulley 115 mounted upon one of the bolts 61 pivotally connecting the upper and lower track sections. The next vertical flight between pulleys 104 and 105 is guided about a similar pulley 116 mounted upon the bolt 61 connecting the opposite track sections. The downward flight of the cable between pulleys 105 and 107 passes in front of a guide pulley 117 mounted upon the cross shaft 82. The flights of cable are therefore maintained in substantial parallelism with the track sections regardless of the relative position of the upper and lower track sections.

It is to be noted that the operator's cab 11 comprises a cab large enough for the single operator, the same including an access doorway 120 facing the rear of the vehicle above one of a pair of side sponsons 121 imparting a streamlined appearance to the vehicle, the forward ends of which provide fenders for the front wheels 13. A step 122 may be provided on the rear end of the sponson to facilitate entry. The chassis preferably comprises counterweights such as a pair of very heavy castings 123 located at the rear thereof so as to augment the load counterbalancing effect of the engine and the fender 24. The cab 11 is positioned over one side of the vehicle with the rear wall thereof preferably an extension of the side wall of the vehicle. The driver's seat 124 is positioned therein against the rear wall of the cab and facing transversely of the vehicle. The driver thus is able to see clearly in both directions so as to increase the safety and ease of maneuvering the vehicle from place to place. The driver's head is so positioned as to allow clear visibility beyond the tower sections. The line of vision of the driver strikes the ground a few inches ahead of the left front wheels and strikes the ground a few inches from the side of the rear tiller wheel. Such as improvement in driver positioning is claimed in the copending application of Harold A. Wagner, executed and filed concurrently herewith.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. A material transporting vehicle comprising a chassis, a lower tower section mounted at one end of said chassis, an upper tower section pivotally mounted on the upper end of said lower section and movable from a prolongation thereof to a collapsed position extending rearwardly over the chassis, a bracing structure extending rearwardly from the upper end of said lower section, a toggle extending from said bracing structure to an elevated portion of said upper section, and means for operating said toggle comprising a reciprocable member mounted on said lower section, a pair of sprocket gears rotatively mounted on said lower section, one of said gears being fixed to an arm of said toggle, and a chain passing about said gears and connected to said member.

2. A material transporting vehicle comprising a chassis, a lower tower section mounted on said chassis, an upper tower section pivotally mounted on the upper end of said lower section and movable from a prolongation thereof to a collapsed position extending rearwardly over the chassis, a bracing structure extending rearwardly from the upper end of said lower section, a toggle extending from said bracing structure to an elevated portion of said upper section, a rotatable member fixed to one of the arms of said toggle coaxially with the pivotal attachment thereof to said bracing structure, a reciprocable member mounted on said lower section, and means linking said reciprocable member to said rotatable member whereby reciprocation of the one causes partial rotation of the other resulting in making or breaking of said toggle and raising and lowering of said upper section.

3. A material transporting vehicle comprising a chassis, a lower tower section mounted on said chassis, an upper tower section pivotally mounted on the upper end of said lower section and movable from a position in prolongation thereof to a collapsed position extending rearwardly over the chassis, a bracing structure extending rearwardly from the upper end of said lower section, a toggle extending from said bracing structure to an elevated portion of said upper section, a rotatable member fixed to one of the arms of said toggle coaxially with the pivotal attachment thereof to said bracing structure, a reciprocable member mounted on said lower section, means linking said reciprocable member to said rotatable member whereby reciprocation of the one causes partial rotation of the other resulting in making or breaking of said toggle and raising and lowering of said upper section, rails on said tower sections, a carriage movably guided by said rails, and cable means associated with said tower sections for raising and lowering said carriage therealong including guide pulleys mounted adjacent the top of said upper section, the joint between said sections and the bottom of said lower section and arranged to maintain the flights of said cable in substantial alignment with the respective tower sections regardless of the relative angularity thereof whereby said carriage may be moved along either section regardless of the angular relation of said sections.

4. A material transporting vehicle comprising a chassis, a lower tower section pivotally mounted on said chassis, an upper tower section pivotally mounted on the upper end of said lower section and movable from a position in prolongation thereof to a collapsed position extending rearwardly over the chassis, a bracing structure extending rearwardly from the upper end of said lower section, a toggle extending from said bracing structure to an elevated portion of said upper section, a rotatable member fixed to one of the arms of said toggle coaxially with the pivotal attachment thereof to said bracing structure, a reciprocable member mounted on said lower section, means linking said reciprocable member to said rotatable member whereby reciprocation of the one causes partial rotation of the other resulting in making or breaking of said toggle and raising and lowering of said upper section, a carriage guided for movement along said tower sections, cable means mounted on said sections for moving said carriage along either section regardless of the relative angularity of said sections, and means for tilting said lower section regardless of the relative position of said upper section.

EDDIE B. WAGNER.

REFERENCES CITED

The following references are of record in the file of this patent:

UNITED STATES PATENTS

| Number | Name | Date |
|---|---|---|
| 1,409,906 | Boehck | Mar. 21, 1922 |
| 2,114,157 | Towson | Apr. 12, 1938 |
| 2,240,236 | Aitken | Apr. 29, 1941 |
| 2,264,512 | Dunham | Dec. 2, 1941 |
| 2,337,109 | Johnson | Dec. 21, 1943 |
| 2,375,337 | Wilson | May 8, 1945 |
| 2,478,462 | Decker | Aug. 9, 1949 |